United States Patent
Konno

(10) Patent No.: US 7,138,347 B2
(45) Date of Patent: Nov. 21, 2006

(54) THICK-FILM CONDUCTOR PASTE FOR AUTOMOTIVE GLASS

(75) Inventor: Takuya Konno, Tochigi-Ken (JP)

(73) Assignee: E. I. du Pont de Nemours and Company, Wilmington, DE (US)

( * ) Notice: Subject to any disclaimer, the term of this patent is extended or adjusted under 35 U.S.C. 154(b) by 210 days.

(21) Appl. No.: 10/641,889

(22) Filed: Aug. 14, 2003

(65) Prior Publication Data

US 2005/0037910 A1    Feb. 17, 2005

(51) Int. Cl.
    C03C 8/18    (2006.01)
    C03C 8/22    (2006.01)
    H01B 1/14    (2006.01)
    H01B 1/08    (2006.01)

(52) U.S. Cl. .......... 501/19; 501/16; 501/20; 501/21; 501/32; 501/77; 252/512; 252/514; 252/519.1; 252/519.3; 252/521.3

(58) Field of Classification Search .......... 501/14, 501/16, 17, 19–21, 32, 77; 252/500–522
    See application file for complete search history.

(56) References Cited

U.S. PATENT DOCUMENTS

| | | | | |
|---|---|---|---|---|
| 4,446,059 A | | 5/1984 | Eustice | |
| 4,554,258 A | * | 11/1985 | Francel | 501/21 |
| 4,567,151 A | * | 1/1986 | Taylor | 501/15 |
| 4,892,847 A | * | 1/1990 | Reinherz | 501/14 |
| 4,906,596 A | * | 3/1990 | Joslin et al. | 501/17 |
| 4,970,178 A | * | 11/1990 | Klimas et al. | 501/26 |
| 5,296,413 A | * | 3/1994 | Carroll et al. | 501/19 |
| 5,302,557 A | * | 4/1994 | Carroll et al. | 501/19 |
| 5,378,408 A | * | 1/1995 | Carroll et al. | 252/514 |
| 5,439,852 A | * | 8/1995 | Hormadaly | 501/26 |
| 5,581,876 A | * | 12/1996 | Prabhu et al. | 29/851 |
| 5,601,638 A | * | 2/1997 | Fukuda et al. | 524/315 |
| 5,616,173 A | * | 4/1997 | Okamoto et al. | 106/1.19 |
| 5,645,765 A | * | 7/1997 | Asada et al. | 252/519.51 |
| 5,725,808 A | * | 3/1998 | Tormey et al. | 252/514 |
| 6,171,987 B1 | * | 1/2001 | Hormadaly | 501/26 |
| 6,197,618 B1 | * | 3/2001 | Guillot et al. | 438/118 |
| 6,355,187 B1 | * | 3/2002 | Sanada et al. | 252/518.1 |
| 6,399,230 B1 | * | 6/2002 | Tormey et al. | 428/702 |
| 6,841,495 B1 | * | 1/2005 | Tanaka et al. | 501/79 |

* cited by examiner

*Primary Examiner*—Karl Group
*Assistant Examiner*—Elizabeth A. Bolden

(57) ABSTRACT

A thick-film composition comprising:
(a) conductive metal;
(b) crystallized glass;
(c) amorphous glass; and
(d) organic medium.

12 Claims, No Drawings

THICK-FILM CONDUCTOR PASTE FOR AUTOMOTIVE GLASS

BACKGROUND OF THE INVENTION

1. Field of the Invention

The present invention in general relates to a thick film conductor paste, and in particular to a thick film conductor composition with superior wear resistance that is used to prevent the fogging of windows in an automobile.

2. Description of Related Art

An important application of patterned electrically-conductive layers is in the automobile manufacturing industry, and particularly in the manufacture of windows which can be defrosted and/or demisted by an electrically-conductive grid permanently attached to the window and capable of producing heat when powered by a voltage source. In order for the window to defrost quickly, the circuit must be capable of supplying large amounts of power from a low voltage power source, typically 12 volts. For such power sources the resistivity requirement of the conductive pattern is generally in the range of from about 2 to about 5 µΩ cm (5 mΩ/square at 10 µm after firing). This requirement is readily met by conductors containing noble metals, particularly silver which is the most commonly-used material for this application.

The substances used in the production of grids for defogging windows include primarily, thick-film silver conductors which are manufactured from a paste composed of fine particles of silver powder and glass frit dispersed in an organic medium. In a typical application, a paste containing 70 wt % of silver powder, 5 wt % of glass frit and 25 wt % of organic medium is screen-printed through a 180 standard mesh screen onto flat, un-formed rear window glass. The printed composition is dried at about 150° C. for at least 2 minutes, following which the entire element is fired in air at 650° C. for 2 to 5 minutes. After firing, the softened window glass is shaped by compression in a mold, then quenched by rapid cooling. The organic medium is removed by vaporization and pyrolysis in the firing cycle. A continuous electrically conductive path is formed by sintering the glass and silver, and having the glass act as a binder for the silver particles.

The prior art relating to such thick-film conductor pastes for automotive glass includes the thick-film paste composition for use in conductive patterns on automotive window glass disclosed in JP 05009623 A, which discloses a composition including a mixture of fine particles containing (a) metallic silver, (b) glass frit having a softening point of 350 to 620° C., and (c) 0.01 to 10 wt %, based on the base paste, of the oxides of transition metals selected from among vanadium, manganese, iron, cobalt and mixtures thereof; wherein components (a), (b) and (c) are dispersed in (d) an organic medium, and the transition metals have a valence of $2^+$ or higher.

Other art of of interest includes U.S. Pat. No. 5,601,638 to Fukada et al. that teaches a thick film paste that may be used in forming a conductor, resistor, insulator, or protector or the like in a ceramic wiring substrate by a screen printing process. However, the Fukada et al. thick film paste requires the use of a resin and a solvent containing 2-tetradecanol or a mixture of 2-tetradecanol with another solvent.

U.S. Pat. No. 5,616,173 to Okamoto et. al. teaches a thick film composition used to apply a conductive pattern that contains fine particle metallic silver and fine particle glass frit having a softening point of 350–620° C. The glass frit is characterized in Okamoto et al. as an amorphous glass. Its composition is not of importance so long as the transition metal oxide is contained in the glass.

U.S. Pat. No. 4,446,059 to Eustice et. al. teaches a conductor composition comprising an admixture of finely divided conductive metal, an amorphous glass binder, and a colorant which is a mixture of $B_2O_3$, copper oxide, and/or a precursor of copper oxide. Again, the composition of the glass binder is not critical to its function.

U.S. Pat. No. 5,296,413 to Carroll et. al teaches a thick film composition for applying conductive patterns comprising finely divided metallic silver particles, glass frit, selected transitional metal oxides, and organic medium. Again the nature of the amorphous glass binders is not critical to the invention.

Typically in this art, the "hot wire" for defogging is formed on the rear window glass and plated to provide the desired weather resistance and resistivity. The "hot wire" is composed primarily of sintered silver and, in the absence of problems relating to resistivity and weatherability, is used without plating. In car models in which the rear windows can be raised and lowered, the hot wire may be subject to wear due to rubbing during raising and lowering of the window. A plating must be applied to the silver conductor to prevent such wear.

In cases where a composition containing a large amount of inorganic material or the like has been employed to enable the hot wire material to withstand wear without having to be plated, the resulting hot wire has often been unable to satisfy other required properties, particularly resistivity, and has thus been unfit for use. However, because of environmental concerns and the need to reduce costs by doing away with plating, there remains a strong desire for a material which has sufficient wear resistance and is capable of satisfying the performance requirements of "hot wires."

Accordingly, the object of the invention is to provide a material which has sufficient wear resistance even when not plated, and can satisfy the performance requirements for hot wires. "Performance requirements," as used herein, refers to such characteristics as resistivity, percent change in resistivity, weather resistance, coloration and printability.

The resistance of the conductive pattern of the present invention is required to be on the order of 2 to 30 millions per square. This requirement is readily compatible with precious metal conductors, especially silver, as noted above. Furthermore, the present invention requires a volume resistivity that is 12 µΩ cm or less and a durability (meaning an absence of breaks in the conductor) of at least 100 rubbing cycles. Additionally, the conductive grid wires, which are contained in the window, must be small enough to maintain visibility through the window.

BRIEF SUMMARY OF THE INVENTION

The present invention provides a thick film composition that comprises: (a) conductive metal; (b) crystallized glass; (c) amorphous glass; and (d) organic medium. The composition may further comprise fine particles of a transition metal oxide selected from among oxides of vanadium, manganese, iron, cobalt, and mixtures thereof. The conductive metal is selected from the group consisting of silver, gold, platinum, palladium, and mixtures thereof.

A composition according to the present invention comprises amorphous glass in an amount of 0.1 to 10.0 wt %, based on the total weight of the composition. A conductive metal may also be present in an amount of 50 to 90 wt %, based on the total composition, and a crystallized glass comprises at least 3 wt % based on the total weight of the composition.

In the present invention, silver particle of between 0.1 to 15 microns may be used in the composition as the conductive metal. A suitable amorphous glass for use in the present invention comprises, based on total composition: $SiO_2$ 36.9%, $ZrO_2$ 3.0%, $B_2O_3$ 3.0%, $Na_2O$ 1.3%, $Li_2O$ 3.0%, $Bi_2O_3$ 46.8%, $TiO_2$ 3.0%, $K_2O$ 3.0% in weight % based on the weight of the total composition.

In the present paste formulation metal oxides may be present in an amount of at least 3 wt %, based on the total weight of the composition.

The present paste may be used for forming conductive patterns on a rigid substrate in the manufacture of an electrically conductive pattern on a substrate, for automotive applications including use as an element in the windshield defroster system.

DETAILED DESCRIPTION OF THE INVENTION

The use of thick-film conductors as components in hybrid microelectronic circuits is well known in the electronics field. Compositions for the manufacture of such components usually take the form of a paste-like solid-liquid dispersion, where the solid phase comprises finely divided particles of a noble metal or a noble metal alloy or mixtures thereof and an inorganic binder. The liquid vehicle for the dispersion is typically an organic liquid medium, but may also be an aqueous-based liquid medium. Additional materials may be added in small quantities (generally less than about 3% by weight of the composition) to modify the properties of the composition and these include staining agents, rheology modifiers, adhesion enhancers and sintering modifiers.

The metals used in the preparation of thick-film conductor compositions are typically selected from silver, gold, platinum and palladium. The metal can be used either in isolation or as a mixture which forms an alloy upon firing. Common metal mixtures include platinum/gold, palladium/silver, platinum/silver, platinum/palladium/gold and platinum/palladium/silver. The most common systems used in the manufacture of heating elements are silver and silver/palladium.

The inorganic binder is typically a glass or glass-forming material, such as a lead silicate, and functions as a binder both within the composition and between the composition and substrate onto which the composition is coated. Due to environmental considerations, the use of lead-containing binders is becoming less common and lead-free binders such as zinc or bismuth borosilicates are now often employed. The role of the organic medium is to disperse the particulate components and to facilitate the transfer of the composition onto the substrate.

The consistency and rheology of the composition is adjusted to the particular method of application which may comprise screen printing, brushing, dipping, extrusion, spraying and the like. Typically, screen printing is used to apply the composition. The pastes are usually applied to an inert substrate, such as an alumina, glass, ceramic, enamel, enamel-coated glass or metal substrate, to form a patterned layer. The thick-film conductor layer is normally dried and then fired, usually at temperatures between about 600 and 900° C., to volatilize or burn off the liquid vehicle and sinter or melt the inorganic binder and the metal components. Direct wet-firing, i.e. wherein the thick film layer is not dried before firing, has also been used to generate the patterned layer.

The present invention provides a thick-film conductor paste composition for automotive glass, which composition includes (a) metallic silver, (b) crystallized glass, (c) amorphous glass, and (d) fine particles of a transition metal oxide selected from among oxides of vanadium, manganese, iron, cobalt, and mixtures thereof; wherein components (a), (b), (c) and (d) are dispersed in (e) an organic medium, and the respective amounts of the components, based on the paste, are 50 to 90 wt % of the metallic silver (a), at least 3 wt % of the crystallized glass (b), and at least 3 wt % of the metal oxides (d) combined.

One conceivable way to enhance the wear resistance without plating is to include a material having a high wear resistance within the paste composition. Crystallized glass generally has a higher wear resistance than amorphous glass. Hence, the wear resistance improves when the composition includes at least a certain amount of crystallized glass. Yet, there are limitations on improving the wear resistance using only crystallized glass. Including too much may result in undesirable effects such as exudation of the glass to the surface, and may adversely impact the percent change in resistivity on account of the sinter promoting effect by the glass.

The addition of a metal oxide ($Co_3O_4$) has been a surprising yet, effective corrective for the above mentioned exudation of the glass to the surface. Because $Co_3O_4$ does not form a liquid phase and promote sintering, there is no danger of glass rising to the surface due to excessive sintering. Typically, metal oxides may be employed as part of the inorganic binder in conductor compositions, as they are known by those skilled in the art to improve conductor solder adhesion. Also, transition metal oxides have been utilized in automobile defogger applications for the purpose of obtaining a coloring effect. However, the transition metal oxides as used in the present invention, have excellent wear resistance, and thus surprisingly, act in concert with the crystalline glass to markedly enhance the wear resistance of the sintered film.

A. Conductive Metal

As stated above, The metals used in the preparation of thick-film conductor compositions are typically selected from silver, gold, platinium and palladium. Any of these metals and mixtures thereof may be utilized in the present invention. Furthermore, by controlling the ratio of conductive components to non-conductive components of the thick film composition, the conductivity of the composition may be manipulated.

Silver flakes or powder can be used in the practice of the present invention. Although the silver particle size itself is not subject to narrow limitations from the standpoint of the technical effects, a size of 0.1 to 15 microns, and especially 0.5 to 5.0 microns, is preferred.

When the particles are larger than 15 microns, the coarseness of the particles slows the sintering process and makes it difficult to achieve the desired resistivity.

On the other hand, when the particles are smaller than 0.1 micron, sintering proceeds too rapidly, resulting in undesirable effects such as the rising of glass to the surface.

Accordingly, the inventive composition contains at least 50 to 90 wt %, based on the paste, of silver particles having an average particle size of 1.0 to 5.0 microns. Preferably, the content of the conductive metal is in the range of 65 to 85 wt %, based on the paste. The content of metal powder is determined to achieve an appropriate thickness of the composition upon firing. If a composition of less than 50 wt % conductive metal is used, the film becomes thinner resulting in poor film strength and a decrease in resistivity.

The silver generally is of high purity (99+%l ). However, depending on the electrical requirements of the pattern, it is also possible to use material of lower purity.

B. Inorganic Binders

As noted above, the inventive composition contains two inorganic binders: amorphous glass and crystallized glass.

The composition is fired at 580 to 680° C., and suitably sintered, wetted and bonded to the glass substrate. Hence, these glass binders have softening points within a range of preferably about 300 to 620° C. The term "softening point," as used herein, refers to the softening point obtained by the fiber elongation method described in ASTM C338-57.

1. Amorphous Glass Binder

The chemical composition of the amorphous glass binder has little import on the function of the invention. For example, lead borosilicate is widely used in pastes for automotive glass, and can be used in working the present invention as well.

Lead silicate and lead borosilicate glass are preferable from the standpoint of both the range in their softening points and their glass bondability.

The amorphous glass binder is included in the paste in an amount, based on the paste, of 0.1 to 10.0 wt %, and preferably 0.5 to 8.0 wt %. A content of more than 10% may cause sintering of the silver to proceed too far and may also cause glass exudation.

On the other hand, at less than 0.1%, an adequate liquid phase does not form, resulting in insufficient sintering, a decline in the film strength, and also eliciting a rise in resistivity.

2. One specific example of the composition of amorphous glass binder that may be used in the present invention comprises the following oxide constituents: $SiO_2$ 36.9%, $ZrO_2$ 3.0%, $B_2O_3$ 3.0%, $Na_2O$ 1.3%, $Li_2O$ 3.0%, $Bi_2O_3$ 46.8%, $TiO_2$ 3.0%, $K_2O$ 3.0% in weight % based on the weight of the total composition.

2. Crystallized Glass Binder

A crystalline material is defined as one that has an orderly periodic array of atoms, and gives rise to distinct diffraction peaks when subjected to X-rays. This crystalline structure contrasts with glasses in general that have a disordered arrangement, with no long term ordering of the atoms and diffuse X-ray diffraction patterns. It is important to the function of the crystallized glass binder that the binder manifest sufficient crystallinity at the peak temperature range during firing. Because the composition is fired at 580 to 620° C., the crystallization point is preferably within a range of 300 to 610° C., and most preferably from 500 to 610° C.

At a crystallization point above 610° C., a sufficient crystalline phase is not obtained upon the completion of firing and so does not improve the wear resistance of the conductor.

On the other hand, at less than 300° C., the flow properties due to crystallization decline, preventing a uniform dispersed state from being achieved and also lowering the sinter-promoting effects resulting from the action of the liquid phase.

The amount of crystalline glass binder included within the paste is from 3.0 to 15.0 wt %, and preferably 5.0 to 10.0 wt %, based on the paste. The use of more than 15 wt % may cause glass exudation, whereas less than 3 wt % results in too low an absolute amount of the binder to expect any improvement in the wear resistance.

One embodiment of the crystalline glass binder used in the present invention is commercially available from Asahi Glass (Product Number ASF1280). The main composition of this Asahi Glass embodiment is 55 wt. % PbO and 24 wt. % Al2O3.

C. Metal Oxide

In the practice of the invention, a transition metal oxide is used to enhance the wear resistance. Suitable oxides include oxides of the transition metals vanadium, manganese, iron and cobalt. The amount required to achieve the desired effect is 3.0 to 15 wt %, and preferably 5.0 to 10.0 wt %, based on the paste. At less than 3.0%, an improvement in the wear resistance cannot be expected. Furthermore, if the amount of the transition metal is greater than 15 wt %, based on total weight of the composition, resistivity is increased and sintering is adversely effected.

Mixtures of separately added transition metal oxides can likewise be used, so long as the total amount of such oxides is the same as that indicated above. In cases where the transition metal oxides are separately added, the particle sizes of the oxides are not subject to any narrow limitations from the standpoint of technical effects. However, the particle sizes must be suitable to the method of use and the firing method.

D. Organic Medium

The metal composition of the invention is generally formed into a paste that can be printed in the desired circuit pattern.

Any suitable inert liquid may be used as the organic medium, although a nonaqueous inert liquid is preferred. Use can be made of any one of various organic liquids which may or may not contain a thickener, a stabilizer and/or other common additives. Examples of organic liquids that can be used include alcohols, esters of such alcohols (e.g., acetic acid and propionates), terpenes (e.g., pine oil, terpineol), resin (e.g., polymethacrylate) solutions, solutions of ethyl cellulose in a solvent (e.g., pine oil), and the monobutyl ether of ethylene glycol monoacetate. The preferred organic medium is composed of ethyl cellulose in terpineol (in a 1:9 ratio), and is based on a combination with a thickener blended with butyl carbitol acetate. The paste is conveniently produced using a three-roll mill. The preferred viscosity of such compositions is about 30 to 100 Pa·s, as measured with a Brookfield HBT viscometer using a #5 spindle at 10 rpm and 25° C. The amount of thickener depends on the viscosity of the ultimately desired composition. That is, it depends on the conditions required for printing. The organic medium generally accounts for 5 to 50 wt % of the paste.

E. Sample Production

The following procedure was used to manufacture a small-scale defogging circuit for evaluation in the subsequently described examples.

1. A solvent-base or UV-curable type of decorative enamel paste was screen printed onto a flat glass substrate using a conventional screen, typically a 156 or 195 mesh polyester screen.

2. The printed enamel pattern was dried at 150° C. for 15 minutes or UV cured at 1.2 J/cm², depending on the type of enamel.

3. The silver paste was screen-printed onto the air side or tin side of a flat glass substrate, or onto the unfired enamel, using a conventional screen, typically a 195 mesh polyester screen. Other mesh sizes, such as 156 or 230 mesh, may also similarly be used.

4. The silver was fired, or both the silver and enamel were fired together, in a belt oven in which the peak glass surface temperature reaches 580 to 680° C.

F. Test Method (1) Wear Resistance:

The serpentine center of the conductor pattern after printing and firing was rubbed with #400 sandpaper and checked for changes in resistivity. Resistivity (R) measurements were carried out once per 20 rubbing cycles (10 times back-and-forth). The values were compared with the initial resistivity (R0) by means of the ratio R/R0

(2) Resistivity:

The resistance of the silver paste printed and fired in a serpentine shape was measured using a Hewlett Packard 347 8A multimeter, and computed as the volume resistivity.

EXAMPLES

The five types of silver paste shown in Table 1 were prepared and used to compare a composition according to this invention with silver pastes of prior-art compositions that are used for the same purpose. The properties of the resulting fired silver conductors are shown in Tables 2 and 3. Example 1 illustrates the present invention, and the other examples are comparative examples for comparison with the invention.

The volume resistivity of thick-film conductors furnished for practical use is 12 μΩ·cm or less. To obtain a wear resistance at least on the same order as that of a plated conductor appears to require a durability (meaning an absence of breaks in the conductor) of at least 100 cycles in the above-described rubbing test.

As is apparent from the results shown in Table 2, in Prior-Art Examples 1 and 2 in which the composition had a low content of crystallized glass, an open circuit arose after 100 rubbing cycles.

The results in Comparative Examples 1 and 2 demonstrate that efforts to improve wear resistance using crystallized glass or a metal oxide alone, though effective for improving the properties to a certain degree, nevertheless result in an open circuit after 100 rubbing cycles. Moreover, as shown in Table 3, the volume resistivity of the conductor rises markedly and fails to satisfy the specification value.

By contrast, the paste formulation in Working Example 1 of the invention results in a volume resistivity that is 12 μΩ·cm or less, and no open circuit even after 100 rubbing cycles.

Table 4 details the various resistivity and change in resistivity values of Working Example 1 demonstrated over a range of firing temperatures and rubbing cycles.

Advantages of the Invention

While the composition of the present invention may be utilized on a variety of substrates, the composition has particular utility on glass substrates in the automotive industry. The inventive thick film composition for vehicle glass having the above-described composition, when used to form an electrically conductive grid on vehicle windows (windshield) for use in defroster system applications, provides, even without plating, sufficient electrical properties and wear resistance for use on rear windows that are raised and lowered.

TABLE 1

|  |  | Prior-art Example 1 | Prior-art Example 2 | Comparative Example 1 | Comparative Example 2 | Working Example 1 |
|---|---|---|---|---|---|---|
| Amorphous glass | wt % | 4.5 | 1.0 | 1.8 | 1.8 | 1.8 |
| Crystallized glass | wt % | 1.0 | 6.2 | 17.4 | 0 | 8.7 |
| Cobalt oxide | wt % | 0 | 0 | 0 | 17.4 | 8.7 |
| Silver | wt % | 75.0 | 75.0 | 67.5 | 67.5 | 67.5 |
| Organic vehicle | wt % | 19.6 | 17.8 | 13.3 | 13.3 | 13.3 |

TABLE 2

(fired at 620° C.)

| Change in resistivity | Number of rubbing cycles | Prior-art Example 1 | Prior-art Example 2 | Comparative Example 1 | Comparative Example 2 | Working Example 1 |
|---|---|---|---|---|---|---|
| R/R0 | 40 | 3.2 | 1.3 | 1.3 | 1.3 | 1.3 |
| R/R0 | 60 | open | 2.1 | 1.7 | 2.2 | 1.6 |
| R/R0 | 80 | open | 110.7 | 2.7 | 13.4 | 2.8 |
| R/R0 | 100 | open | Open | open | open | 16.5 |

TABLE 3

Initial resistivity (fired at 620° C.)

| | Prior-art Example 1 | Prior-art Example 2 | Comparative Example 1 | Comparative Example 2 | Working Example 1 |
|---|---|---|---|---|---|
| Resistivity μm·cm [sic] | 2.9 | 11.0 | 8.9 | 14.3 | 10.1 |

TABLE 4

Example Data Over Various Firing Temperatures Ranges

| Firing Temperature | Change in Resistivity (R/R0) by Number of Rubbing Cycles | | | | Resisitivity |
|---|---|---|---|---|---|
| ° C. | 40 | 60 | 80 | 100 | μm·cm |
| 600 | 1.1 | 1.5 | 2.7 | 11 | 10.5 |
| 620 | 1.3 | 1.6 | 2.8 | 16.5 | 10.1 |
| 640 | 1.3 | 1.7 | 2.9 | 7 | 9.7 |

Because the automotive glass thick film conductor paste of the present invention is structured as above, when an electrically conductive grid is formed on the window of an automobile using this paste, even if the paste film is not plated; a thick film conductor paste with superior wear resistivity, percent change in resistivity, weather resistance, coloration and printability can be obtained.

What is claimed is:

1. A thick-film composition comprising:
   (a) conductive metal;
   (b) crystallized glass;
   (c) amorphous glass; and
   (d) organic medium, and fine particles of cobalt oxide.

2. The composition as in claim 1 wherein said conductive metal is selected from the group consisting of silver, gold, platinum, palladium, and mixtures thereof.

3. The thick-film composition as in any one of claims 1 wherein said amorphous glass is present in the amount of 0.1 to 10.0 wt %, based on the weight of the total composition, including the organic medium.

4. The thick-film composition as in any one of claims 1 wherein said conductive metal is present in the amount of 50 to 90 wt %, based on the weight of the total composition, including the organic medium.

5. The thick-film composition as in any one of claims 1 wherein said crystallized glass comprises at least 3 wt % based on the weight of the total composition, including the organic medium.

6. The thick-film composition as in claim 2 wherein the conductive metal is silver and wherein the particle size of said silver is between 0.1 to 15 microns.

7. The thick-film composition of claim 1 wherein the composition of said amorphous glass comprises, based on total composition; $SiO_2$ 36.9%, $ZrO_2$ 3.0%, $B_2O_3$ 3.0%. $Na_2O$ 1.3%, $Li_2O$ 3.0%, $Bi_2O_3$ 46.8%, $TiO_2$ 3.0%, $K_2O$ 3.0% in weight % based on the weight of the total composition.

8. The thick-film composition of claim 1 wherein said fine particles of cobalt oxide are present in the amount of at least 3 wt %, based on the total composition, including the organic medIum.

9. The method of using the thick-film composition of claim 1, to form conductive patterns on a rigid substrate, comprising the following steps:
   (a) screen printing said thick-film composition through a mesh screen onto a rigid substrate;
   (b) drying said composition;
   (c) firing said substrate and composition so as to form a conductive pattern on the substrate.

10. The method of using the thick-film composition of claim 1, in the manufacture of an electrically conductive pattern on a substrate, comprising the following steps:
   (a) screen printing said thick-film composition through a mesh screen onto a rigid substrate;
   (b) drying said composition;
   (c) firing said substrate and composition so as to form a conductive pattern on to substrate; and
   (d) removing the organic medium.

11. The method of using the thick-film composition of claim 1 for automotive glass applications, comprising the following steps:
   (a) screen printing said thick-film composition through a mesh screen onto a rigid, fiat unformed window glass;
   (b) drying said composition at about 150 degrees C.;
   (c) firing said glass and composition at about 650 degrees C. so as to form a conductive pattern on the glass;
   (d) shaping the glass by compression into a mold and quenching the glass by rapid cooling;
   (e) removing the organic medium by vaporization and pyrolysis and
   (f) sintering the glass and metal conductive powder.

12. A vehicle comprising a windshield defroster system said windshield defroster system comprising a conductive element wherein said conductive element is formed from the thick-film composition as in any one of claims 1,2–8.

* * * * *

UNITED STATES PATENT AND TRADEMARK OFFICE
CERTIFICATE OF CORRECTION

PATENT NO. : 7,138,347 B2 Page 1 of 1
APPLICATION NO. : 10/641889
DATED : November 21, 2006
INVENTOR(S) : Konno Takuya It is certified that error appears in the above-identified patent and that said Letters Patent is hereby corrected as shown below:

On page 2, column 2, line 43 replace "2 to 30 million per square" with -- 2 to 30 micro-ohm per square --.

Signed and Sealed this

Twenty-seventh Day of February, 2007

JON W. DUDAS
*Director of the United States Patent and Trademark Office*